(12) United States Patent
Wahle et al.

(10) Patent No.: US 7,776,103 B2
(45) Date of Patent: Aug. 17, 2010

(54) USE OF ALKOXYLATED POLYOL DERIVATIVES FOR TREATING TEXTILES

(75) Inventors: Bernd Wahle, Kaarst (DE); Christa Hartschen, Krefeld (DE); Juergen Falkowski, Monheim (DE); Werner Mauer, Muenster (DE)

(73) Assignee: Cognis IP Management GmbH, Duesseldorf (DE)

( * ) Notice: Subject to any disclaimer, the term of this patent is extended or adjusted under 35 U.S.C. 154(b) by 589 days.

(21) Appl. No.: 10/826,646

(22) Filed: Apr. 16, 2004

(65) Prior Publication Data

US 2004/0205898 A1    Oct. 21, 2004

(30) Foreign Application Priority Data

Apr. 17, 2003   (DE) ................ 103 18 079

(51) Int. Cl.
*C11D 3/34* (2006.01)
(52) U.S. Cl. ......................................... 8/137
(58) Field of Classification Search ........... 8/115.51, 8/127.5, 137, 127.51; 427/412, 338, 342, 427/389, 393.3
See application file for complete search history.

(56) References Cited

U.S. PATENT DOCUMENTS 3,933,421 A * 1/1976 Lewis .................. 8/428

4,448,817 A * 5/1984 Benisek et al. .......... 427/412

FOREIGN PATENT DOCUMENTS

| GB | 1 423 341 | 2/1976 |
|---|---|---|
| GB | 1 423 342 | 2/1976 |

* cited by examiner

*Primary Examiner*—Lorna M Douyon
*Assistant Examiner*—Amina Khan

(57) ABSTRACT

Described is a process for washing, cleaning or aftertreatment of laundry comprising treating the laundry with compounds of formula (II):

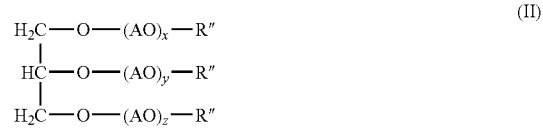

wherein R", independently of each other, represent a hydrogen atom or a sulfur-containing group selected from the group consisting of $OC-CH_2-S-SO_3M$, $SO_3M$, and wherein at least one R" has to be one of the sulfur-containing groups, AO, independently of each other, represent $C_2H_4O-$, $C_3H_6O-$ or $C_4H_8O-$, the indices x, y and z, independently of one another, are 0 or their sum have a value of from 1 to 500, M is a cation having at least one charge, and wherein if x, y or z is zero, than its corresponding substituent R" is a hydrogen atom; and mixtures thereof.

10 Claims, 1 Drawing Sheet

Before

After

USE OF ALKOXYLATED POLYOL DERIVATIVES FOR TREATING TEXTILES

BACKGROUND OF THE INVENTION

This invention relates to salts of alkoxylated S-containing polyols, to water-based preparations containing such salts and to the use of the salts or the water-based preparations in washing, cleaning or aftertreatment compositions for textiles and, more particularly, for treating textiles containing wool or cotton.

The effect known as pilling often occurs in the washing of textiles, more particularly textiles containing natural fibers, such as wool and cotton. It is known from the prior art that this effect can be avoided or reduced by the use of certain Bunte salts. Bunte salts are a group of sulfur compounds with the general formula R—S—SO$_2$—OM (thiosulfuric acid S esters), where R is an organic, generally aliphatic radical and M is a monovalent metal cation. Bunte salts as such have been known for some time and are used for various applications. GB 1,423,341 and GB 1,423,342 describe Bunte salts and alkoxylated derivatives thereof for the treatment of hair, for coloring fibers and for the finishing and treatment of textiles. It is clear from GB 1,423,341 that the Bunte salts described therein are also suitable for use in wool treatment preparations.

Now, the present invention is based on the surprising observation that selected alkoxylated and cationically or anionically derivatized polyols with, preferably, relatively high molecular weights have special properties in the treatment of fibers and textiles, particularly those of wool, and especially during the washing of wool. Derivatives with, preferably, sulfur-containing functionalities have been found to show particularly good properties.

Figure 1:
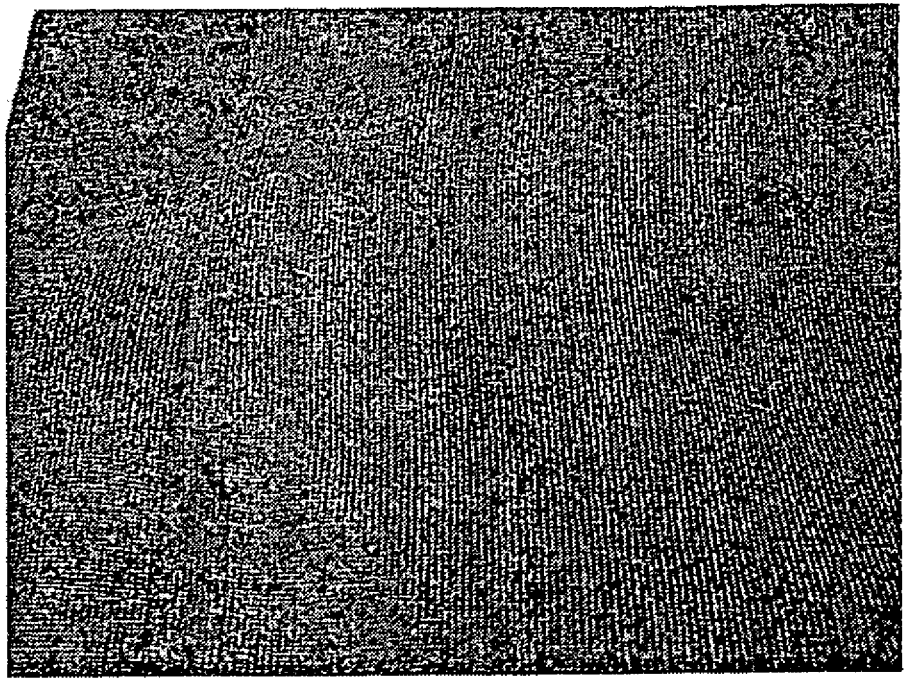
FIG. 1 shows photographs of an old heavy-pilled wool pullover both prior to, and after, its treatment with a composition in accordance with the present invention.
Figure 1:
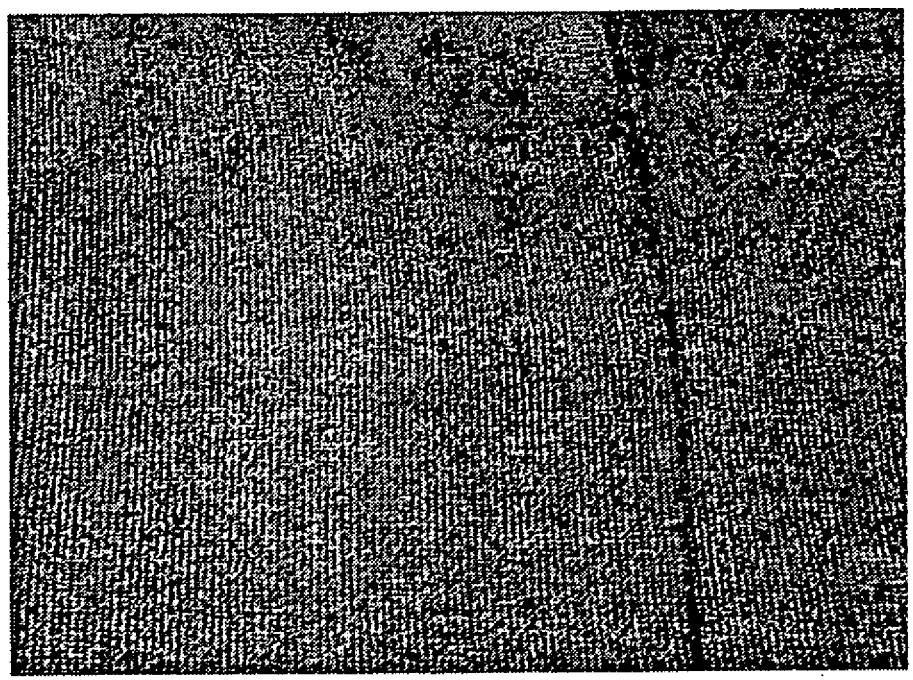

In a first embodiment, therefore, the present invention relates to compounds corresponding to general formula (I):

R—[O-(AO)$_n$—R']$_m$ (I)

in which R is an at least monofunctional, saturated or unsaturated, branched or unbranched alkyl group containing at least 2 and at most 36 carbon atoms, m is an integer of 1 to 16 and n is a number of 1 to 500, with the proviso that the product of n and m has a value of at least 1 and the substituents R' independently of one another represent a hydrogen atom or a group OC—CH$_2$—S—SO$_3$M, SO$_3$M or SO$_4$M, the compounds having to contain at least one substituent R which is not a hydrogen atom, and the AO's independently of one another represent a group C$_2$H$_4$O—, C$_3$H$_6$O— or C$_4$H$_8$O— and M is a cation with at least one charge. However, preferred compounds of formula (I) are those in which the groups (AO) are present in quantities of, in all, 10 to 100, more particularly 30 to 80 and preferably 40 to 60.

S-containing alkoxylated derivatives of glycerol corresponding to general formula (II):

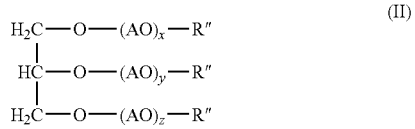

(II)

in which the substituents R" independently of one another represent a hydrogen atom or a group OC—CH$_2$—S—SO$_3$M or SO$_3$M, at least one substituent R" which is not a hydrogen atom having to be present in the compounds, the AO's independently of one another represent a group C$_2$H$_4$O—, C$_3$H$_6$O— or C$_4$H$_8$O— and the indices x, y and z independently of one another stand for 0 or for even or uneven numbers which, together, should have a value of at least 1 and at most 500, and the M's represent a cation with at least one charge, with the further proviso that, where x, y or z is 0, the particular substituent R" is a hydrogen atom. Compounds of formulae (I) and (II) where R" is a group OC—CH$_2$—S—SO$_3$M are preferred. Such compounds are Bunte salts. Compounds of formula (II), in which x, y and z together have a value of 10 to 100, more particularly 30 to 80 and preferably 40 to 60, are preferred.

The compounds of general formula (I) above are preferably prepared by reacting the alkoxylated polyol, preferably a glycerol, with chloroacetic acid in a first step. It has proved to be of advantage to carry out the esterification at elevated temperatures, preferably in the range from 140° C. to 200° C., and under reduced pressure, more particularly 20 to 40 mbar. Under these reaction conditions, the water released during the esterification is distilled off. The reaction mixture is then left to cool and sodium thiosulfate is added to the chloroacetic acid ester. A lower organic alcohol, such as isopropanol or ethanol, is added as solvent. The subsequent reaction takes place in the boiling range of the solvent. The solvent is then distilled off and the crude product obtained is mixed with water to give the end product. If the compounds of formula (I) are sulfated, i.e. if R' or R" is a group SO$_3$M, any of the sulfation processes known to the expert may be used for the synthesis.

The compounds corresponding to general formula (I) contain alkoxide groups (AO) which, independently of one another, may be selected from the groups C$_2$H$_4$O—, C$_3$H$_6$O— and/or C$_4$H$_8$O—. The invention also encompasses compounds in which the individual hydroxyl groups of the glycerol have been reacted with ethylene oxide, propylene oxide and/or butylene oxide and isomers thereof or with mixtures of ethylene oxide, propylene oxide and/or butylene oxide. Alkoxylated polyols and preferably glycerols of which the OH groups have been completely alkoxylated are preferably used for the synthesis of the compounds according to the invention. Compounds of formula (I) containing only ethylene oxide groups or only propylene oxide groups are particularly preferred. Compounds of formula (I) or (II) which are only propoxylated are particularly preferred for the purposes of the present invention.

The cations M are preferably selected from the group consisting of sodium and potassium, sodium being particularly preferred. However, other cations, for example ammonium salts and NH$_4^+$, may also be used.

Besides the anionically modified compounds of formula (I), cationic modifications are also suitable in principle. In such cases, quaternized N atoms, for example, are integrated into the molecules.

In formula (I), the index m stands for the number of derivatized OH groups of the particular polyol, compounds of formula (I) in which the index m is a number of 1 to 10, preferably 1 to 5 and more particularly 1 to 3 preferably being selected. The product of the indices n and m together is advantageously at least 50. The maximum value for the product of n and m is about 500. The molecular weight (M$_R$) of the compounds of formula (I) is preferably 500 or more and, more preferably, 1,000 or more.

If the substituent R in formula (I) is based on glycerol, i.e. if 3 carbon atoms and 3 hydroxyl groups are present, compounds of formula (I) in which the index m is 3 and the index n is a number of 15 to 50, the total number of groups (AO)

preferably having to be at least 50, are preferred. In this case, too, compounds which are only propoxylated are preferred.

Besides the derivatives based on glycerol, derivatives of other polyols containing at least 2 hydroxyl groups and 2 carbon atoms may be used. In that case, polyols, such as glycols, more particularly polyethylene glycols, triethylol propane or ethane, trimethylol propane or ethane, neopentyl glycol, pentaerythritol, or sugars, such as glucose or sorbitol or oligomers or polymers thereof, but also mono-, di- or triethanolamines or polymers thereof, which are functionalized as described above, are preferably used.

The present invention also relates to water-based preparations which contain the compounds of formula (I) or preferably formula (II) in quantities of 0.1 to 90% by weight, preferably up to 60% by weight, based on the total weight of the preparation. These water-based preparations advantageously have a pH value at 21° C. of 4 to 10.5, preferably 5 to 9 and more particularly 6 to 8. In one most particularly preferred embodiment, the pH value is in the range from 8.0 to 8.5.

These preparations contain the compounds corresponding to formula (I) in quantities of 0.1 to 90, preferably 10 to 50, more preferably 25 to 45 and most preferably 35 to 45% by weight. Besides water and the compounds corresponding to formula (I), the preparations according to the invention preferably—but optionally—contain acids or bases for pH adjustment and other known auxiliaries and additives, more especially for detergents and cleaning compositions.

In addition, water-based preparations which, besides the compounds of formula (I), also contain surfactants, preferably nonionic surfactants, for example fatty alcohol ethoxylates and derivatives thereof, may also be formulated in accordance with the invention.

The compounds of formula (I) are suitable for the permanent or temporary treatment of textiles of all kinds, i.e. both synthetic and natural fibers or blended fabrics of all kinds. The compounds of formula (I) or (II) are preferably used in particular for washing keratin-containing textile fibers or textiles containing such fibers and for the treatment of cotton or textiles containing cotton. However, they are preferably used for the treatment of wool or wool blends. Besides textiles consisting solely of wool, textiles containing wool in combination with other typical and suitable fibers, for example of polyimide or polyester fibers, may of course also be used.

The treatment of preferably wool fibers or textiles containing wool fibers with the compounds corresponding to formula (I) surprisingly leads to an improvement in pilling behavior. Pilling on the surface of the fibers can be effectively prevented by the use of the compounds of formula (I). In addition, the treatment of the textiles with the compounds or preparations according to the invention leads to a reduction in the number of pills present. Smoothing of the fibers is observed and the textiles appear smoother to the eye.

Accordingly, the present invention also relates to the use of the water-based preparations described above for the treatment of keratin-containing fibers and in particular for the treatment of wool fibers or textiles consisting partly or entirely of wool or for the treatment of cotton.

The compounds of formula (I) and preferably formula (II) are generally suitable for use in known detergents and cleaning compositions. The compounds of formula (I) or (II) in the form of their water-based preparations are used with particular advantage in conjunction with detergents known per se for the washing and care of woollens. This may be done simultaneously or at separate times; for example, the woollens to be washed may first be treated with the softeners and the preparations according to the invention subsequently added in a separate step. However, the water-based preparations according to the present invention are preferably used together with softeners for the aftertreatment of laundry. Such softeners, also known as conditioners, are familiar to the expert and are generally water-based formulations which contain mixtures of anionic and nonionic surfactants, optionally in combination with quaternary ammonium compounds and, in particular, quaternary ammonium compounds containing one or more ester functions in the molecule. The addition of compounds corresponding to formula (I) or the water-based preparations described above to such detergents or conditioners leads to a distinct improvement in the care effect on wool and, in particular, to a distinct limitation and reduction of pilling.

EXAMPLES

Example 1

Tests were carried out to evaluate shrinkage and pilling behavior after washing with a commercial wool detergent containing additions of 1%, 5% and 10% of a water-based preparation according to the invention and drying in air and in a tumble dryer. The water-based preparation contained 42% by weight of a propoxylated compound of formula (II) with x+y+z=50. The pH value of the water-based preparation at 21° C. was 8.0. The shrinkage of the washed woollen samples was 4% in every case. In the pilling test, no major differences were observed between the air-dried and the tumble-dried samples.

| Washing of woollens in a Miele washing machine | |
|---|---|
| Program: | wool, 40° C., water plus |
| Load: | 1 kg |
| Spin cycle: | 400 rpm. |
| Drying: | 1. air |
| | 2. tumble dryer, program: colors |
| Dosage: | 0-sample 90.0 g Perwoll liquid (comparison) |
| | 1-sample 89.1 g Perwoll liquid + 0.9 g of the preparation according to the invention |
| | 2-sample 85.5 g Perwoll liquid + 4.5 g of the preparation according to the invention |
| | 3-sample 81.0 g Perwoll liquid + 9.0 g of the preparation according to the invention |

Evaluation

By human eye—the higher the value, the weaker the pilling effect.

| Pilling evaluation: drying in air | | | | | |
|---|---|---|---|---|---|
| Sample | 125 rpm | 500 rpm | 1000 rpm | 2000 rpm | 5000 rpm |
| 0 | 4 | 3-4 | 3 | 2-3 | 2 |
| 1 | 4 | 3-4 | 2-3 | 2 | 1-2 |
| 2 | 4-5 | 4 | 3-4 | 3 | 2-3 |
| 3 | 5 | 5 | 4-5 | 4 | 3-4 |

| Pilling evaluation: tumble drying | | | | | |
|---|---|---|---|---|---|
| Sample | 125 rpm | 500 rpm | 1000 rpm | 2000 rpm | 5000 rpm |
| 0 | 4 | 3-4 | 3 | 2 | 2 |
| 1 | 4 | 3-4 | 3 | 2 | 1-2 |
| 2 | 4-5 | 4 | 3-4 | 3 | 2-3 |
| 3 | 5 | 5 | 4-5 | 4 | 3-4 |

Example 2

The shrinkage behavior after 1, 10 and 20 washes and pilling behavior after 20 washes of machine-washable pullovers (pure new wool) were determined using a) a wool detergent and b) the wool detergent with an addition of 10% by weight of the same water-based preparation as in Example 1. The shrinkage of the pullover washed with Perwoll was minimal. The pullover washed with Perwoll plus the preparation according to the invention showed no shrinkage. In the pilling test, there were clear differences up to 500 rpm. It was noticeable that the stitch pattern was clearer and more compact after 20 washes with the detergent plus the preparation according to the invention.

| Washing of woollens in the Miele washing machine | |
|---|---|
| Program: | wool, 40° C., water plus |
| Load: | 1 kg |
| Spin cycle: | 400 rpm. |
| Drying: | 1. air |
| Dosage: | 0-sample  90.0 g Perwoll liquid (comparison) |
| | 1-sample  81.0 g Perwoll liquid + 9 g of the preparation according to the invention |

Shrinkage evaluation: drying in air

| Sample | Starting value | 1st Wash | 10th Wash | 20th Wash |
|---|---|---|---|---|
| Washed with Perwoll | 25 × 25 cm 100% | 24.6 × 24.5 cm 1.6% 2% | 24.5 × 24.4 cm 2% 2.4% | 24.5 × 24.4 cm 2% 2.4% |
| Plus preparation according to the invention | 25 × 25 cm 100% | 25 × 25 cm 100% | 25 × 25 cm 100% | 25 × 25 cm 100% |

Pilling evaluation: drying in air

| Sample | 125 rpm | 500 rpm | 1000 rpm | 2000 rpm | 5000 rpm |
|---|---|---|---|---|---|
| Washed with Perwoll | 4-5 | 3 | 2-3 | 2 | 1 |
| +10% of the preparation according to the invention | 5 | 4 | 3 | 2-3 | 1-2 |

Example 3

Tests were carried out to evaluate shrinkage and pilling behavior after washing with a wool detergent (Perwoll, C1), with glycerol+50PO (C2), with glycerol+50PO quaternized with 3-chloro-2-hydroxypropyl dimethyl dodecyl ammonium chloride (C3) and the same preparation according to the invention as in Example 1 (I) and drying in air and in a tumble dryer. The shrinkage of the washed woollen samples was 4% in every case. In the pilling test, there were noticeable differences between the normal wool detergent and the individual substances of the air-dried and tumble-dried samples.

| Washing of woollens in a Miele washing machine | |
|---|---|
| Program: | wool, 40° C., water plus |
| Load: | 1 kg |
| Spin cycle: | 400 rpm. |
| Drying: | a. air |
| | b. tumble dryer, program: colors |
| Dosage: | 1-sample  90 g  C1 |
| | 2-sample  9 g  C2 |
| | 3-sample  9 g  C3 |
| | 4-sample  9 g  I |

Pilling evaluation: drying in air

| Washed sample | 125 rpm | 500 rpm | 1000 rpm | 2000 rpm | 5000 rpm |
|---|---|---|---|---|---|
| Water only | 4 | 5 | 2-3 | 1-2 | 1 |
| C1 | 4 | 3-4 | 3 | 2-3 | 2 |
| C2 | 4-5 | 4 | 3-4 | 1-2 | 1 |
| C3 | 4-5 | 4 | 3-4 | 1-2 | 1 |
| I | 5 | 4 | 3-4 | 2-3 | 2 |

Pilling evaluation: tumble drying

| Washed sample | 125 rpm | 500 rpm | 1000 rpm | 2000 rpm | 5000 rpm |
|---|---|---|---|---|---|
| Water only | 4 | 3 | 2 | 1 | 1 |
| C1 | 4 | 3-4 | 3 | 2 | 1-2 |
| C2 | 4-5 | 4 | 3 | 1 | 1 |
| C3 | 4-5 | 4 | 3 | 2 | 1-2 |
| I | 5 | 4 | 3-4 | 2-3 | 1-2 |

Example 4

An old, well-worn and heavily pilled wool pullover was subjected to a washing test using a commercially obtainable wool detergent (Perwoll, a Henkel product) together with the same water-based preparation as in Example 1.

The pullover was washed in a Miele washing machine (program: wool, 40° C., water plus). The machine load was 1 kg. The speed of the spin cycle was 400 rpm. The dosage was 90 g of Perwoll liquid plus 9 g of the water-based preparation according to the invention. After washing, the pullover was dried in air. Evaluation of the washed pullover revealed distinct differences. Even the old, well-worn pullover showed a clearer stitch pattern. The heavy pilling effect was no longer in evidence. The results are photographically reproduced in FIG. 1.

The invention claimed is:
1. A process for washing, cleaning or aftertreatment of laundry consisting of:
  (1) contacting said laundry at a temperature of less than or equal to about 40° C., with an aqueous composition comprising:

(a) a compound of formula (II):

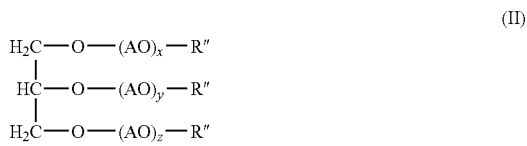

(II)

wherein R", independently of each other, represent a hydrogen atom or a sulfur-containing group selected from the group consisting of OC—$CH_2$—S—$SO_3M$ and $SO_3M$, and, wherein, at least one R" is a sulfur-containing group, AO, independently of each other, represents $C_2H_4O$—, $C_3H_6O$— or $C_4H_8O$—, the indices x, y and z, independently of one another, are 0 or their sum has a value of from 1 to 500, M is a cation having at least one charge, provided that when any of x, y or z is zero, its corresponding substituent R" is a hydrogen atom;
  (b) at least one member selected from the group consisting of textile fiber cleaning surfactants and textile fiber softening agents; and
  (c) water; and
(2) drying said laundry;
wherein the treated laundry exhibits reduced pilling.

2. The process of claim 1, wherein, in formula (II) the sum of x+y+z is a number of from 10 to 100.

3. The process of claim 1, wherein, the sum of x+y+z is a number of from 50 to 500.

4. The process of claim 1, wherein, AO is exclusively $C_2H_4O$.

5. The process of claim 1, wherein, AO is exclusively $C_3H_6O$.

6. The process of claim 1 wherein the compound of formula (II) is present in the composition in an amount of from about 0.1 to 90% by weight, based on the weight of the composition.

7. The process of claim 1 wherein the compound of formula (II) is present in the composition in an amount of from about 25 to 45% by weight, based on the weight of the composition.

8. The process of claim 1 wherein the textile fibers comprise at least one member selected from the group consisting of wool fibers and cotton fibers.

9. The process of claim 1 wherein said contacting step is washing or cleaning.

10. The process of claim 1 wherein said composition is a detergent composition.

* * * * *